Nov. 28, 1961  T. O. KOSATKA  3,010,742
SEALING DEVICES
Filed March 24, 1958
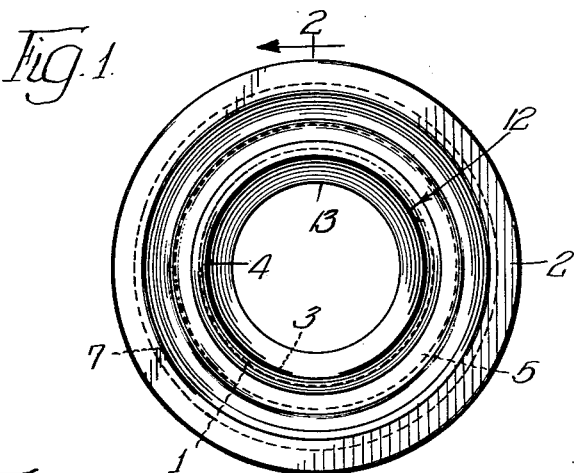
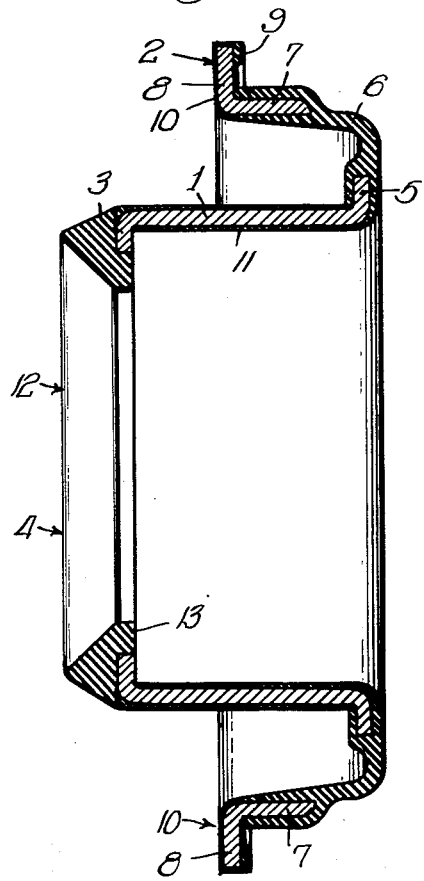
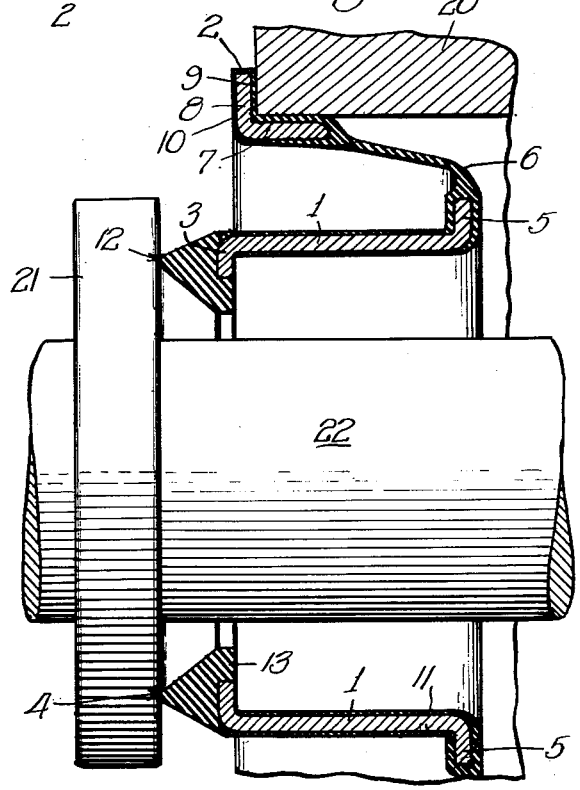
INVENTOR.
Thomas O. Kosatka,
BY
George H. Simmons
Atty.

United States Patent Office 3,010,742
Patented Nov. 28, 1961

3,010,742
SEALING DEVICES
Thomas O. Kosatka, Chicago, Ill., assignor to Victor Manufacturing & Gasket Co., Chicago, Ill., a corporation of Illinois
Filed Mar. 24, 1958, Ser. No. 723,499
1 Claim. (Cl. 286—11)

This invention relates to devices for forming a fluid tight seal between a radial shoulder on a shaft and a housing having a bore through which the shaft projects, and has for its principal object the provision of a new and improved device of this kind.

It is a main object of the invention to provide a sealing device having an elastomer spring that is in tension when the device is in operating position, which spring maintains the seal ring of the device in seal forming engagement with the shoulder on the shaft.

Another object of the invention is to provide a sealing device having a seal ring carrying an inner ring which encircles the shaft and an outer ring fitting in the bore in the housing, through which the shaft projects, which inner and outer rings are connected together by an elastomer spring which also forms a fluid tight seal therebetween.

Another object of the invention is to a sealing device which is of simple construction that can be manufactured at low cost without sacrificing quality.

Further objects of the invention not specifically mentioned here will be apparent from the detailed description and claim which follows, reference being had to the accompanying drawings in which a preferred embodiment of the invention is shown by way of example and in which:

FIG. 1 is a plan view of a seal embodying the invention;

FIG. 2 is a cross sectional view taken substantially along the line 2—2 of FIG. 1, drawn to an enlarged scale; and FIG. 3 is a view similar to FIG. 2, showing the seal in normal operating position.

Sealing devices for forming a fluid tight seal between a shoulder on a shaft and a bore in a housing through which the shaft projects, usually consist of an outer member in seal forming engagement with the bore in the housing and an inner member that carries a seal ring which is pressed by a spring into seal forming engagement with a radial surface on the shaft. A bellows extends between the inner and outer members to form a fluid tight seal therebetween. In certain instances where cost is a primary factor, seals of this type are unduly expensive and it is to the production of a seal which can be manufactured at low cost that the instant invention particularly pertains.

In its preferred form, the sealing device of the present invention employs an outer ring in seal forming engagement with the bore, an inner ring that carries the seal ring by which seal with the radial surface on the shaft is maintained, and an elastomer spring connected between the inner and outer members and stressed in tension when the sealing device is in normal operating position, thereby to urge the seal ring into seal forming engagement with the radial surface on the shaft. The elastomer spring, which is impervious to coolants, oils, and the like, with which it comes into contact, serves also as a bellows to form a fluid tight seal between the inner and outer members of the device.

The sealing device of the present invention, by eliminating many of the parts going into similar devices of the prior art of which I am aware, can be manufactured at low cost without sacrificing quality.

The invention will be best understood by reference to the accompanying drawings, particularly FIG. 2, wherein it will be seen that the sealing device of the present invention consists of an inner member 1 and an outer member 2, both composed of metal, preferably a corrosive resistant metal such as brass, corrosion resistant steel, and the like. In its preferred form, the inner member 1 is cylindrical in shape and of such dimension as to freely encircle the shaft. Located at the forward end of the member 1 is an in-turned flange 3 to which the seal ring 4 is fixed, preferably by bonding. Located at the rear end of the member 1 is an out-turned flange 5, to which one of the elastomer spring 6 is fixed.

The outer member 2, likewise composed of a corrosion resistant material, is of L-shape section having a cylindrical portion 7, from the forward end of which a radial portion 8 projects outwardly. The spring 6 embraces both the inner and outer faces of the cylindrical portion 7 and also extends across the rear face of the outwardly extending flange 8, as indicated at 9.

In the commercial molding of an elastomer material to metal, flashes of elastomer usually occur, and it may well be that the outer ring 2 will be completely covered with a flash of elastomer, as indicated at 10, and likewise the inner and outer surfaces of the inner member 1 may be covered with a flash, as indicated at 11. While such complete covering of the metallic parts of the seal is not of the essence of the present invention, it is nevertheless advantageous when it occurs, for the reason that it adds protection to the metallic parts, thereby preventing corrosion of the same.

The seal ring 4 is of generally V-shape cross section and presents a narrow sealing surface 12 for engagement with the radial surface on a shaft to form a fluid tight seal therewith. At the inner edge of the seal ring 4 is an annular extension 13 which covers the inner edge of the inturned flange 3 and is fixed thereto. The seal ring 4 is preferably composed of an elastomer that is relatively hard, having a durometer hardness of not less than 80 on a B scale. The material may also be loaded with a friction reducing compound, such as graphite, so as to maintain seal with a metallic surface with a minimum of friction. If the composition of the seal ring is such that it can be bonded to metal, the ring 4 is attached to the flange 3 by bonding. If the material in the seal ring is of a composition that cannot be bonded to metal economically, the ring 4 is fixed on the flange by other means such as cementing. In any event, a fluid tight seal is formed between the seal ring 4 and the inner member 1.

The spring 6 is preferably composed of an elastomer which is impervious to coolants, oils and the like, and which is of such composition as to have high elasticity in tension and to have not less than 90% recovery after stretching. The Buna N and neoprene elastomers meet this requirement.

As will be seen in FIG. 3, when the sealing device is inserted in the bore of a housing 20, the outer ring 2 presses the elastomer on the outer face of its cylindrical portion against the bore and the portion 9 of this elastomer against the face of the housing, thereby to form a fluid tight seal between the sealing device and the housing, and to set up sufficient resistance to prevent turning of the sealing device in the bore. The seal ring 4 engages the sealing surface of a shoulder 21 on the shaft 22, and as the shaft is moved into operating position the seal ring 4 and inner ring 1 to which it is attached are telescoped into the bore. This stretches the spring 6, thereby exerting a pressure on the sealing ring 4 to maintain that ring in seal forming engagement with the surface of the shoulder 21. In one instance the seal of the present invention required a force of thirteen (13) pounds to telescope the inner member of the seal into the outer member a distance of one-eighth (⅛) of an inch from the free position of the sealing device. The seal thus met the specifications of the manufacturer of the machine in which it is designed to be used.

Seals of the present invention adapt themselves readily for use in the water pumps of automotive equipment. Frequently in such devices the center of the shaft, such as 22, does not coincide with the center of the bore in the housing by several thousandths of an inch; nevertheless, seal can be maintained since the inner member of the device has ample radial motion to compensate for the eccentricity of the shaft. In other instances, the shaft, such as 22, does not rotate truly around its axis, but rather the axis of the shaft travels in a circle centered on the axis of rotation during rotation of the shaft. This rotation of the center of the shaft produces what is known as dynamic eccentricity, and the forces set up by such eccentricity stress the bond between the seal ring and the device in which it is mounted. The seal ring 4, being equipped with a rearwardly extending annular projection 13 which engages and is bonded to the inner edge of the inwardly turned flange 3, enables the sealing ring to withstand forces imposed upon it by dynamic eccentricity without danger of shearing the seal ring from the flange, even though the dynamic eccentricity and forces set up thereby are the maximum likely to be encountered in pumps of this kind.

In one instance, a seal ring composed of Buna N loaded so as to have a durometer hardness of 85, after a short period of run-in against a companion metal sealing surface, became glazed and polished. A tight seal was thus formed and maintained for a long period of time notwithstanding that the dynamic eccentricity of the test pump was near the maximum likely to be encountered. The friction between the glazed seal ring and metal surface it engaged was low and any tendency of the seal ring to rotate with the shaft was resisted by the elastomer spring without difficulty.

In the sealing device of the present invention, the pressure by which the sealing ring 4 is maintained in contact with the sealing surface on the shoulder of the shaft can be varied by varying the thickness of the spring 6 and by varying the composition of the elastomer of which the spring is composed. This enables the sealing device to be constructed so as to operate successfully over a wide range of pressures against which seal must be maintained.

In the manufacture of the devices of the present invention, with the sealing ring 4 preferably composed of an elastomeric material that can be molded and possesses the requisite characteristics, and with the elastomer spring 6 composed of a moldable material, and in instances where both of these materials can be bonded to metal, the sealing device can be formed with a single molding operation notwithstanding that two different compositions of material are employed in it. As a result of its simplicity of design and ease of manufacture, the sealing device can be manufactured at low cost without sacrificing quality.

While I have chosen to illustrate my invention by showing and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claim.

What I claim is:

A device for forming a seal between a bore in a housing and a radial shoulder on a shaft that extends through said bore, comprising: a rigid inner cylindrical ring; a flange extending radially inwardly at one end of said ring; an outwardly extending flange at the other end of said ring; a seal ring fixed upon said inwardly extending flange and extending axially outwardly therefrom; a rigid outer ring of L cross section, the cylindrical portion of which fits within the bore and the annular portion of which overhangs the housing; an elastomer spring encompassing and bonded to said outer ring and extending to the outwardly extending flange on said inner ring and therearound encompassing the inner ring to which it is bonded, said spring holding the device together as a unit with the outer ring positioned in line with the approximate center of the cylindrical portion of the inner ring when the device is in relaxed state, engagement of the seal ring with the shoulder on the shaft in operating position and engagement of the outer ring with the housing telescoping the inner ring axially of the outer ring and elongating said elastomer spring thereby to build up and maintain pressure between the seal ring and shoulder.

References Cited in the file of this patent

UNITED STATES PATENTS

| | | |
|---|---|---|
| 2,358,536 | Reynolds | Sept. 19, 1944 |
| 2,743,950 | Helfrecht et al. | May 1, 1956 |
| 2,744,772 | Amirault et al. | May 8, 1956 |
| 2,814,513 | Kupfert et al. | Nov. 26, 1957 |

FOREIGN PATENTS

| | | |
|---|---|---|
| 631,981 | Great Britain | Nov. 14, 1949 |